United States Patent [19]

Goudswaard

[11] Patent Number: 4,697,347

[45] Date of Patent: Oct. 6, 1987

[54] APPARATUS FOR DERIVING THREE-DIMENSIONAL QUANTITATIVE INFORMATION FROM AT LEAST ONE STEREOPAIR

[75] Inventor: Frederik Goudswaard, Losser, Netherlands

[73] Assignee: 501 Stichting Internationaal Instituut Voor Lucht, Netherlands

[21] Appl. No.: 881,418

[22] Filed: Jul. 2, 1986

[30] Foreign Application Priority Data

Jul. 12, 1985 [NL] Netherlands ............... 8502014
Jun. 16, 1986 [NL] Netherlands ............... 8601552

[51] Int. Cl.⁴ ............................................. G01C 11/08
[52] U.S. Cl. .................................... 33/1 A; 356/2
[58] Field of Search ............... 33/1 A, 20.4; 350/136; 356/2

[56] References Cited

U.S. PATENT DOCUMENTS

| | | | |
|---|---|---|---|
| 3,465,444 | 9/1969 | Blachut et al. | 33/1 A |
| 3,750,293 | 8/1973 | Forrest | 33/20.4 |
| 3,994,563 | 11/1976 | Barsai et al. | 33/1 A |
| 4,233,740 | 11/1980 | Bunn et al. | 33/1 A |
| 4,539,701 | 9/1985 | Galbreath et al. | 356/2 |

FOREIGN PATENT DOCUMENTS

| | | | |
|---|---|---|---|
| 686324 | 5/1964 | Canada | 33/20.4 |
| 1188654 | 9/1959 | France | 356/2 |
| 2373777 | 8/1978 | France | 33/1 A |
| 377545 | 6/1964 | Switzerland | 33/20.4 |

Primary Examiner—Richard R. Stearns
Attorney, Agent, or Firm—John P. Snyder

[57] ABSTRACT

A pair of photographs of the same object taken from different positions and fixed to a single carrying plate the position of which can be adjusted in a first plane. Three measuring devices are associated with the carrying plate for determining the coordinates of the plate to indicate the distance and angle of the plate relative to a fixed reference system. Binocular optical means includes two measuring marks respectively having lines of sight intersecting said two photographs. The lines of sight are parallel to one another and lie in a plane disposed perpendicular to the first plane. One of the marks can be moved relative to the other so that the lines of sight may intersect identical points on the two photographs. A fourth measuring device is provided for measuring the distance between said lines of sight. The outputs from the four measuring devices are fed into a computer for deriving three dimensional quantitative information about the object.

12 Claims, 5 Drawing Figures

APPARATUS FOR DERIVING THREE-DIMENSIONAL QUANTITATIVE INFORMATION FROM AT LEAST ONE STEREOPAIR

The invention relates to apparatus for deriving three-dimensional quantitative information of an object from at least one stereopair of photographs of said object, e.g. aerial photographs of the earth's surface, said apparatus comprising:
  carrying means for carrying said photographs, said carrying means being movable with previously chosen degrees of freedom,
  measuring means for determining the position coordinates and angular coordinates of said carrying means relative to a previously chosen coordinate system,
  a stereoscopic observation system that is provided with an adjustable apparatus for determining the difference between the position coordinates of the corresponding pictures in the single photograph images of said stereopairs, in such a way that a user can, for every point of a stereopair, derive the desired three dimensional information.

In photogrammetry use is made of aerial photographs, which are measured and further processed in stereoscopic instruments. A purpose thereof is to derive three dimensional terrain quantities from two photographs made from different positions. In the optical observation system of the instruments measuring marks are present, e.g. point-shaped indexes, with which in the stereoscopic image every observed point can be indicated in space. Every determined position is defined by the corresponding position coordinates in both photographs. The required terrain coordinates can be derived from the position coordinates in the photographs by means of a calculating system, on basis of relations known from analytical photogrammetry.

Usually the aerial photographs (negatives) are recorded on film strips. The common terrain coverage (overlap) of two subsequent records covers about 60% of the photografic format.

For further processing (restitution) in conventional instruments to the user copies (positives) are made available of each single record. For restitution of a stereopair, however, only the overlaps are used.

All conventional photogrammatic stereo instruments are provided with two separate carrying plates for fixation of the two separate photographs.

For calculation of terrain coordinate parameters are necessary, which are dependent upon internal and external circumstances during the recording and furthermore upon the orientation of the photographs relative to the measuring system of the restitution instrument. The parameters usually are determined by means of an orientation process, which may or may not be totally or partially automated, which process takes place in the restitution phase by a specially trained operator.

The invention has as its purpose to totally avoid the orientation process during the restitution procedure, which gives the following advantages:
  1. The restitution instrument can be more simple and therefore cheaper.
  2. The operation of the restitution instrument is more simple and the required photogrammatic knowledge and skill of the operator is less than that required with prior art devices. The result of this is that no specially trained operators are necessary. The specialist in a certain field of application, such as an expert in the field of topography, geology, forestery, civil enginerring, cartography, etcetera, can, after a short training period perform the necessary measurements himself. Also this will have a positive influence on the price, the fast availability and the quality of the final product.

It also should be noted that it can produce a larger application field for measuring purposes of stereophotographs, particularly aerial photographs.

In order to realize said purpose the invention provides an apparatus that makes it possible to use parameters which are previously determined in a separate procedure, in such a way that in the restitution phase no orientation procedure has to be performed. An apparatus of the type mentioned in the preamble is characterized in that said carrying means comprise only one flat carrying plate for carrying in one plane the stereopairs of photographs, said carrying plate being freely shiftable by a user in said plane relative to the measuring means and being adapted for maintaining in previously chosen fixed positions the related photographs relative to said carrying plate.

A preferred embodiment exhibits the special feature that the carrying plate is coupled with three linear measuring devices, each having a fixed measuring line, two of said measuring lines being mutually parallel ($\bar{y}1, \bar{y}2$) and spaced apart a distance (D) and the third one ($\bar{x}$) being perpendicular to said first and said second measuring lines. In this case advantageously the said linear measuring devices each contact mutually perpendicular edges of the carrying plate with a point positioned on the related measuring line. In this embodiment the measuring lines of the linear measuring devices upon rotation of the carrying plate always pass through the contact point of the linear measuring devices and the carrying plate.

An instrument according to the invention comprises, contrary to conventional instruments, only one carrying plate for photographs, particularly for two or three such photographs, forming together one, and two mutually coupled, stereopairs. The overlapping images are fixed on the carrying plate in the form of one fixed "stereogram".

In order to ensure a uniquely reproduceable mutual fixation of the photographs of a stereopair adventageously use can be made of an embodiment in which the carrying plate is provided with means for contacting edge perforations of the photographs.

According to the invention preference is given to an alternative embodiment, in which corresponding overlaps of two or more photographs are positioned in common on one photograph sheet or other support element assuring the fixed mutual positioning of those overlaps.

An exact and reliable restitution of the stereoscopic information is ensured in an embodiment, wherein the stereoscopic observation system comprises at least two lines of sight, one of which is fixed and the other one of which is movable exclusively in the x-direction. While using the above mentioned linear measuring devices in this case preferably the fixed line of sight extends through the intersection point of the measuring lines of two of the linear measuring devices. Thus it is ensured that the well known measuring priciple of Abbe.

A simple embodiment is provided the carrying plate is coupled with an adjustable device determining the angular position of the carrying plate by means of a parallel guidance system.

The invention will now be explained with reference to a drawing. In the drawing.

Figure 1:
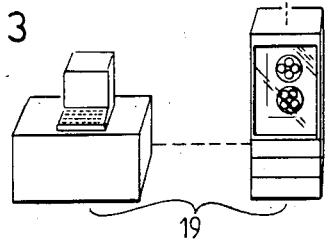
FIG. 1 shows a schematic representation of a stereopair consisting of two photographs, said stereopair being fixed on one carrying plate.
Figure 1:
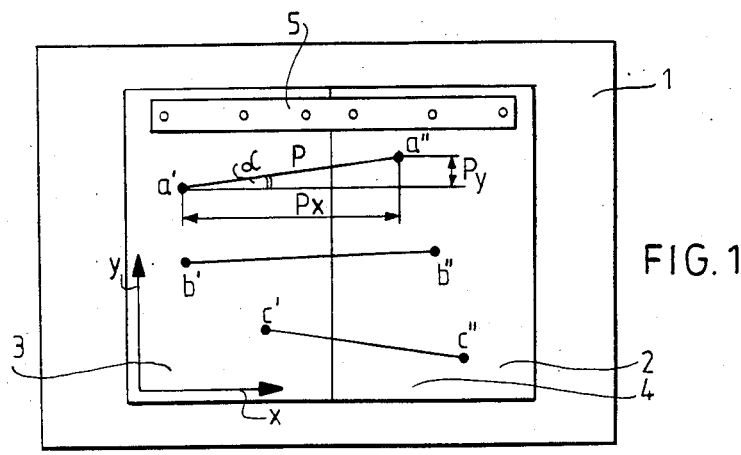

FIG. 1 shows a flat carrying plate 1 that is adapted for carrying a stereogram 2, made from two aerial photographs 3, 4 forming together a stereopair. The unique positioning of the stereogram 2 is ensured by means of a fixation strip 5 for cooperating with edge perforations of the stereogram 2.

Characters x and y indicate a coordinate system in the plane of the stereogram.

In photograph 3 three image points a', b' and c' are shown corresponding with points a", b" and c" in photograph 4. It will be clear that the stereoscopic information related to the hight of the related terrain point, is correlated with the position differences in both photographs of the related point.

Now reference is made to point a. The values for x" and y" can also be expressed as:

$$x'' = x' + p_x$$

$$y'' = y' + p_y$$

in which $p_x$ and $p_y$, respectively, are the x-component and the y-component of the parallax p.

In ideal recordings, in which the camera is directed exactly vertically and the recording level is the same for every recording, on the recorded stereograms all connection lines between corresponding image point pairs will appear mutually parallel. This means that the y-parallax $p_y$ is equal for all points. It may be 0. The distance $p_y$, however, is generally not equal for all points, as it is directly related with the terrain level differences.

With non-ideal recordings there will be y-parallax differences in the stereogram, so that the connection lines will generally be nonparallel. The angular displacement, therefore, is a function of the orientation parameters and the terrain level differences. Apart from the y-parallaxes the parameters also influence the values of the x-parallaxes, and accordingly the value p as it appears in the stereogram.

In the apparatus according to the invention the relative position of the right-hand picture relative to the left-hand picture is expressed in the angular displacement α and the distance p along the connection line between the related image points.

The relation of the x-parallax and the y-parallax is expressed as:

$$p_x = p \cdot \cos \alpha$$

$$p_y = p \cdot \sin \alpha$$

Figure 2:
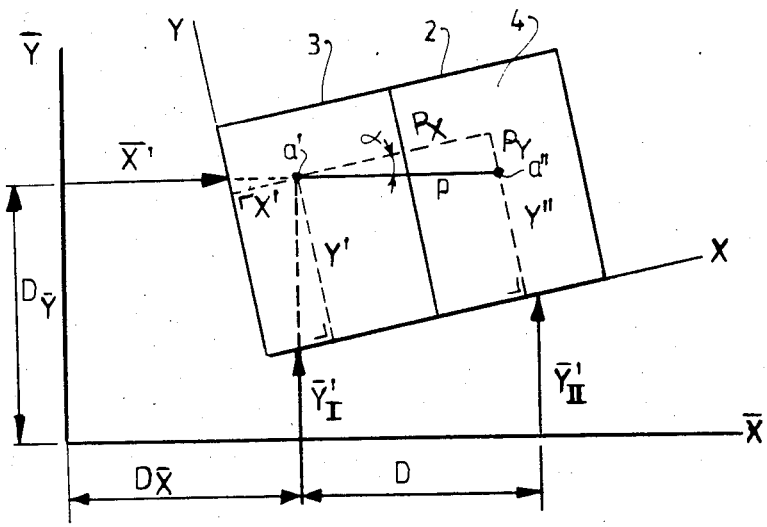
FIG. 2 is a diagram illustrating the basic principles of the invention.

In an apparatus according to the invention, described below with reference to FIG. 3, the image coordinates are measured as schematically indicated in FIG. 2.

The stereogram 2 has an xy-coordinate system, relative to which the position coordinates of the image points a' and a" have to be expressed.

The position of a' and a" is found by means of a measurement relative to a fixed auxiliary coordinate system $\bar{x}\bar{y}$, by positioning this stereogram in such a way that:

1. the point a' coincides with a fixed point in the xy-coordinate system, with coordinates ($D_x$; $D_y$),
2. the connection line a' a" extends in parallel with the x-axis.

The distance p and the position of the xy-coordinate system relative to the fixed $\bar{x}$-$\bar{y}$-axes, expressed in the values $\bar{x}'$, $\bar{y}'_I$ and $\bar{y}'_{II}$ is measured as indicated in FIG. 2.

The required position coordinates can be derived from the measured values on the basis of the following relations:

$$x' = (D_{\bar{x}} - \bar{x}') \cos \alpha$$

$$y' = (D_{\bar{y}} - \bar{y}_I) \cos \alpha$$

$$x'' = x' + p \cdot \cos \alpha$$

$$y'' = y' - p \cdot \sin \alpha$$

$$\alpha = \arctan \frac{\bar{y}_{II} - \bar{y}_I}{D}$$

In photogrammetry the orientation parameters are determined in a procedure that is known as aero triangulation (A.T.), which is based on a very accurate measurement of image coordinates at certain points. Modern photogrammetry employs for this purpose special stereocomparators. In principle the measuring of stereograms by A.T. requires such a stereocomparator. However, none of the existing stereocomparators is adapted or able to measure stereograms of the type discussed here. The above described measuring system is very adequate as a stereo comparator for measuring stereograms as well as separate stereo photographs. Apart from use as a stereocomparator the instrument according to the invention is also very well suited as a restitution instrument of the type that is known in photogrammetry as an "analytical plotter" (A.P.), particularly if it is adapted for stereograms.

Figure 3:
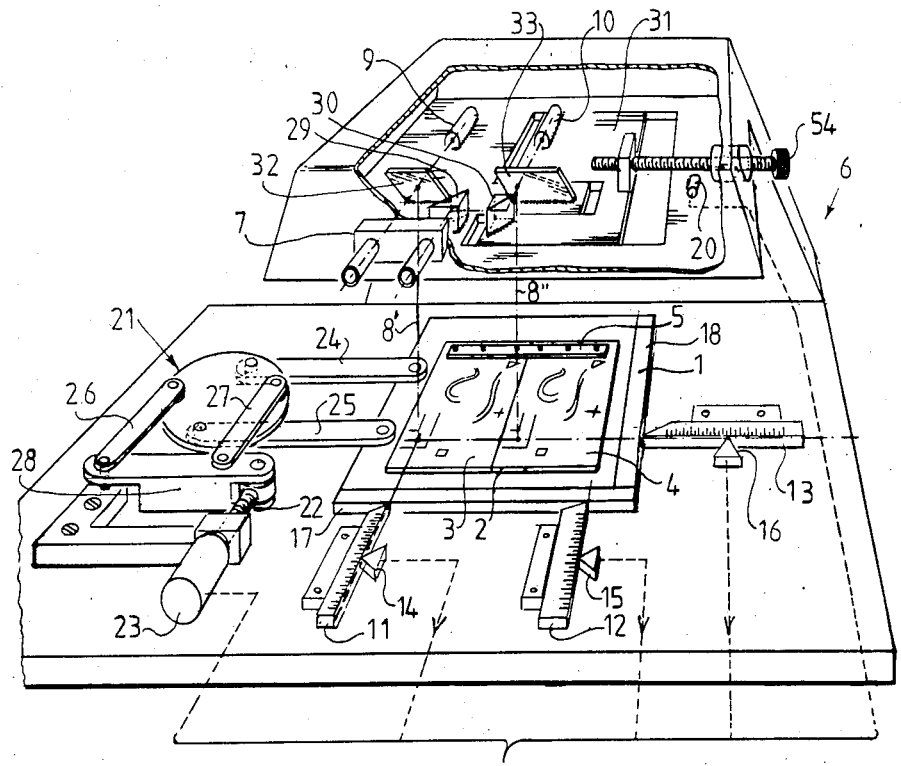
FIG. 3 is an apparatus according to the invention adapted for restitution of a pair of photographs or a stereogram.

FIG. 3 shows an apparatus 6 in a first embodiment of the invention. It comprises a flat carrying plate 1 according to FIG. 1, on which the stereogram 2 is uniquely fixed by means of a closing strip 5. Carrying plate 1 can be moved in its own plane relative to the fixed coordinate system $\bar{x}\bar{y}$ indicated in FIG. 2, that is not shown again in FIG. 3. A binocular stereoscopic observation system 7 has two vertical lines of sight, 8' and 8", respectively, along which two corresponding image points can be observed.

In the optical system two measuring marks 9, 10 are present, with which a spacial adjustment can take place on a point to be measured. The left-hand line of sight 8' has a fixed position, the right-hand line of sight 8" can be moved in the $\bar{x}$-direction by means of a measuring screw 54. By means of the adjustment screw 54 parallax p is measured.

Parameters $\bar{x}$, $\bar{y}$ and α are measured by means of three measuring rules 11, 12 and 13, respectively, which are axially shiftable along three fixed measuring lines positioned in the horizontal plane of movement of the flat carrying plane 1.

Each rule is provided with a fixed index 14, 15, 16, respectively for reading the related measuring value. In this embodiment indexes 14, 15, 16 are also engineered as position sensors for supplying the related position signals to a computer, generally indicated at 19 and adapted for receiving the required information from the supplied input signals.

Two of the fixed measuring lines, namely the longitudinal axes of rules 11 and 12 are parallel to the y-axis and the fixed measuring line of rule 13 extends in the x-direction.

The ends of measuring rules 11, 12, 13 cooperating with the mutually perpendicular side-edges 17, 18 of carrying plate 1 are pointed, so that the measuring lines are sharply defined.

In order to satisfy the well known measuring principle of Abbe the position of the measuring lines of measuring rules 11 and 13 are chosen in such a way that they intersect with the fixed line of sight 8' of the observation system 7.

The measuring line of measuring rule 12 has a fixed distance D to the measuring line of measuring rule 11. During movement of the carrying plate 1 measuring rules 11, 12, 13 are also moved due to their contact with the said side edges 17, 18 of the carrying plate 1. The orientation and the position of the carrying plate 1 are fully determined by measurement of the values visibly given by the indexes 14, 15, 16, or the output signals supplied to the computer 19 by sensors 14, 15, 16, respectively. Together with the measurement of the parallax p by means of measuring screw 54 that in FIG. 3 supplies output signals by means of a position sensor 20, these data are sufficient to express any pair of points of the stereogram by their position coordinates, in accordance with the above described measuring principle.

For accurately adjusting the angular position α of the carrying plate 1 it is controlled in its freedom of movement by a parallel guidance system, the orientation of which is adjusted by means of an adjustment screw 22. The adjustment screw 22 is coupled with a step motor 23 controlled by computer 19. It is obvious that measuring screw 54 could also be controlled by a motor controlled by computer 19.

The parallel guidance system comprises a rotatable disk 21 cooperating through two hinge rods 24, 25 with carrying plate 1. Disk 21 is in turn through rods 26, 27 driven by the adjustment screw 22, that for this purpose cooperates with the free end of a hinge arm 28.

Measuring marks 9, 10 are engineered as optical units in the observation system 7.

Measuring screw 54 cooperates with a table 31 shiftable in the x-direction, on which measuring mark 10 is placed together with a prism 30. By adjustment of the measuring screw 54 line of sight 8 is moved and can be adjusted to the image point on photograph 4 corresponding with the image point on photograph 3 to which line of sight 8' is adjusted.

The observation system 7 receives the images of photographs 3 and 4, respectively, through semi-transparant mirrors 32, 33, in such a way that corresponding points on said photographs can be brought into optical coincidence with the respective measuring marks.

The embodiment of the invention shown in FIG. 3, can be used as a stereocomparator and as an analytical plotter. In the first mentioned case the movements of the carrying plate 1 and the measuring screw 54 are directly operated by the operator. In the second case screws 22 and 54 are digitally controlled by the computer 19, while the measuring rules are provided with indexes 14, 15, 16 engineered as sensors, from which the information is directly supplied into the computer.

Figure 4:
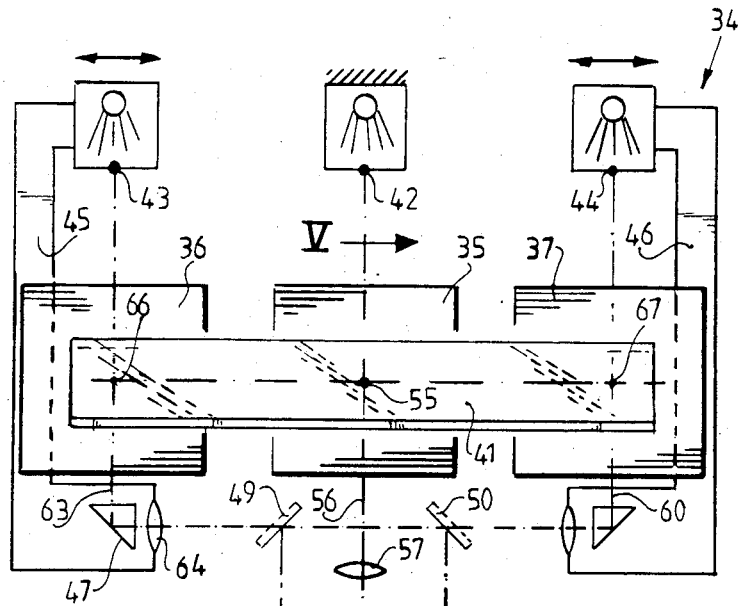
FIG. 4 is a schematic representation of an apparatus according to the invention, which is adapted for the restitution of three subsequent photographs.

FIG. 4 shown an alternative embodiment of the invention. The apparatus 34, very schematically shown, differs from the apparatus 6 according to FIG. 3 with respect to the number of photographs to be analyzed simultaneously. The apparatus 6 analyses the overlaps of the two photographs 3, 4, while in the embodiment according to FIG. 4 there is one full picture photograph 35 in the middle and two photographs 36 and 37, respectively, having overlaps with only photograph 35, thereby providing, coupled stereopairs 35, 36 and 35, 37, respectively. With this embodiment connection errors are avoided, so that error propagation can be less.

The apparatus 34 comprises a stereoscopic observation system 38 having a left-hand ocular 39 and a right-hand ocular 40.

In the mode of the observation system 38 indicated with solid lines the photographs 35 and 37, forming a stereopair together, are observed stereoscopically together with their corresponding measuring marks 42 and 44. It is noted that the image of photograph 35 follows, together with measuring mark 42, the path 56 in the direction of the stereoscopic observation system 38. It passes through a lens 57, is reflected by a prism 58 in the direction of a semi-transparant mirror 51, after which it passes through a Dove prism 59 and the right-hand ocular 40, through which it can be observed by the user.

The image of photograph 37 is, together with measuring mark 44, observed through the left-hand ocular 39. It follows a path 60 through a prism 48, lens 65, then passes through the semi-transparant mirror 50, is reflected by a semi-transparant mirror 49, passes through a semi-transparant mirror 52, is reflected by a prism 61, and reaches at last through reflection by a pentagon-prism 62 the left-hand ocular 39.

In the mode of operation of the stereoscopic observation system 38 indicated with broken lines photograph 35 together with the measuring mark 42 is observed through the left-hand ocular 39 and photograph 36 with the measuring mark 43 trough the right-hand ocular 40.

A switching device is present which is known per se and is indicated as "clip-clop". This device comprises an opaque screen 53 that is rotatably positioned and is coupled with prism 58. The screen 53 interrupts, in the mode of operation indicated with solid lines, the path of the rays between mirrors 50 and 51 and interrupts in the mode of operation indicated with broken lines the path of the rays between mirrors 49 and 52. The image of photograph 35, in the situation to be discussed now, follows the path 56 via lens 57, prism 58, semi-transparant mirror 52, prism 61, pentagon prism 62 and eventually reaches the left-hand ocular 39.

The image of photograph 36 with the measuring mark 43 follows a path 63 via a prism 47, a lens 64, through the semi-transparent mirror 49, is reflected by mirror 50, passes through the semi-transparent mirror 51 and the Dove prism 59 and eventually reaches the right-hand ocular 40.

The line of sight 55 for the middle photograph 35 and the corresponding measuring mark 42 has a fixed position, while lines of sight 66 and 67 of photograph 36 and 37, respectively, are movable together with the corresponding measuring marks 43, 44 by means of carriages 45, 46, respectively, the position of which is adjustable in the x-direction in a manner similar to corresponding table 31 of FIG. 3. The adjusting means necessary therefor, such as the adjustment screw 54 in FIG. 3, are not shown in FIG. 4. Prisms 47 and 48 are fixed on carriages 45 and 46, so that measuring marks 43, 44 are movable in the x-direction.

From the above it will be clear that the transition from one stereopair 35, 37 to the other stereopair 36, 35 takes place exclusively by optical switching of the stereoscopic observation system 38, particularly by turning over 180° of the prism 58 and the displacement of the opaque screen 53.

After the discussion of the embodiment according to FIG. 3 no functional description will given of the embodiment according to FIG. 4. It will be clear that the adjustment of lines of sight 66, 67 in the x-direction takes place for measuring the paralax p in the related stereopair.

The apparatus 34 according to FIG. 4 is designed in such a way that the number of image inversions for the left-hand image and the right-hand image is equal.

Also it has been taken into account that upon switching from the one stereopair to the other stereopair the mutual position of the two photographs of a pair has always be the same, in other words, such as in the present embodiment, the right-hand photograph always appears in the left-hand ocular and the left-hand photograph always appears always in the right-hand ocular. Thus, a user does not receives false stereoscopic information, due to which he sees height as depth and vice versa.

Figure 5:
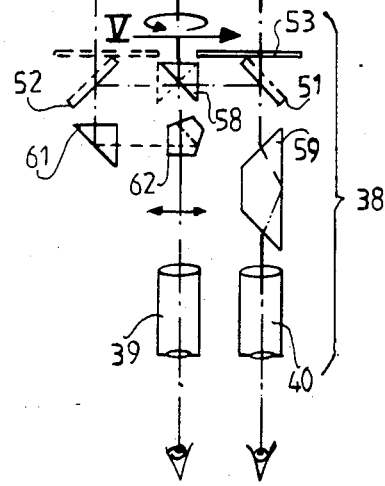
FIG. 5 is a section along line V—V in FIG. 4.
Figure 5:
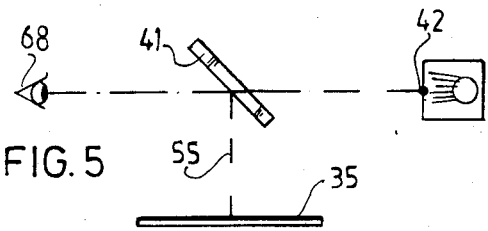

FIG. 5 schematically shows a cross section through the middle photograph 35 and the line of sight 55, together with the transparant mirror 41 and measuring mark 42. Symbolically an eye 68 is shown as the related part of the stereoscopic observation system 38.

At last, for completeness sake it is once more noted that the middle photograph 35 partially overlaps both other photographs 36, 37, and accordingly by switching between the two respective stereopairs 35, 37 and 36, 35 no connection error can occur and the middle photograph 35 can be processed and restituted completely.

I claim:

1. Apparatus for deriving three dimensional quantitative information of an object from at least one stereopair of photographs of said object, e.g. aerial photographs of the earth's surface, said apparatus comprising:
   carrying means for carrying said photographs, said carrying means being movable with previously chosen degrees of freedom,
   measuring means for determining the position coordinates and angular coordinates of said carrying means relative to a previously chosen coordinate system,
   a stereoscopic observation system that is provided with an adjustable apparatus for determining the difference between the position coordinates of the corresponding pictures in the single photograph images of said stereopair, characterized in that
   said carrying means comprises only one flat carrying plate for carrying in one plane the stereopair of photographs, said carrying plate being freely shiftable in said plane relative to the measuring means and being adapted for maintaining in previously chosen fixed positions the related photographs relative to said carrying plate.

2. Apparatus according to claim 1 characterized in that the carrying plate is coupled with three linear measuring devices, each having a fixed measuring line, two of said measuring lines being mutually parallel ($y_1$, $y_2$) and having a distance (D) therebetween and the third one (x) being perpendicular to said two measuring lines.

3. Apparatus according to claim 2, characterized in that said linear measuring devices each contact mutually perpendicular edges of the carrying plate with a point positioned on the related measuring line.

4. Apparatus according to claim 3 wherein the carrying plate is provided with means for contacting edge-perforations of the photographs.

5. Apparatus according to claim 3 wherein the apparatus is provided with means for adjustably determining the angular position of the carrying plate.

6. Apparatus according to claim 2 wherein the carrying plate is provided with means for contacting edge-perforations of the photographs.

7. Apparatus according to claim 2 wherein the apparatus is provided with means for adjustably determining the angular position of the carrying plate.

8. Apparatus according to claim 1 wherein the carrying plate is provided with means for contacting edge-perforations of the photographs.

9. Apparatus according to claim 1 wherein the apparatus is provided with means for adjustably determining the angular position of the carrying plate.

10. Apparatus for deriving three dimensional information from a pair of photographic images of the same object taken from different positions, which comprises the combination of carrying plate means for holding the photographic images in fixed relation to each other to define an image plane, binocular optical means for observing the two images along respective lines of sight which are parallel to each other defining a fixed plane directed perpendicularly to the image plane, means for rotating the carrying plate means relative to the fixed plane and means for varying the distance between the respective lines of sight so that identical points of the images are oriented in coincidence with the respective lines of sight, means for determining the adjusted distance between the lines of sight, and means for determining the change in orientation between the carrying plate means and the fixed plane in response to rotation of the carrying plate means.

11. Apparatus as defined in claim 10 wherein three images of the same object taken from different positions are disposed on said carrying plate means in fixed relation to each other, said binocular optical means including three lines of sight corresponding to said three images, a pair of oculars and means for selecting a pair of the images for observation along the respective lines of sight.

12. Apparatus as defined in claim 11 wherein said means for selecting includes a rotatable prism for directing the respective lines of sight onto a pair of the images and means for blocking the line of sight to the third image.

* * * * *